(12) United States Patent
Nisley et al.

(10) Patent No.: US 7,419,305 B2
(45) Date of Patent: Sep. 2, 2008

(54) SEALING SYSTEM FOR BEARING ASSEMBLY

(75) Inventors: Donald L. Nisley, Greenville, SC (US); James E. Mickelson, Simpsonville, SC (US)

(73) Assignee: Reliance Electric Technologies LLC, Mayfield Heights, OH (US)

( * ) Notice: Subject to any disclaimer, the term of this patent is extended or adjusted under 35 U.S.C. 154(b) by 755 days.

(21) Appl. No.: 09/938,793

(22) Filed: Aug. 24, 2001

(65) Prior Publication Data

US 2003/0039422 A1 Feb. 27, 2003

(51) Int. Cl.
*F16C 33/76* (2006.01)

(52) U.S. Cl. .................. 384/477; 384/478; 384/486

(58) Field of Classification Search ............. 384/477 O, 384/478 X, 480, 484, 474, 482, 485, 398, 384/465, 479, 481, 486 X, 486, 489
See application file for complete search history.

(56) References Cited

U.S. PATENT DOCUMENTS

| | | | | |
|---|---|---|---|---|
| 1,226,240 A * | 5/1917 | Murphy | ...................... | 384/477 |
| 3,382,018 A * | 5/1968 | Brkich | ........................ | 384/477 |
| 3,656,824 A * | 4/1972 | Ullberg | ....................... | 384/482 |
| 4,348,067 A * | 9/1982 | Tooley | ....................... | 384/480 |
| 4,368,933 A * | 1/1983 | Motsch | ........................ | 384/489 |
| 4,484,752 A * | 11/1984 | Bentley | ....................... | 277/377 |
| 4,781,476 A * | 11/1988 | Uhen | ......................... | 384/136 |
| 4,832,511 A * | 5/1989 | Nisley et al. | ................. | 384/480 |
| 4,895,460 A * | 1/1990 | Grzina | ........................ | 384/132 |
| 4,943,068 A * | 7/1990 | Hatch et al. | ................. | 277/353 |
| 5,209,499 A * | 5/1993 | Ruff et al. | .................... | 384/477 |
| 5,259,628 A * | 11/1993 | Nisley | ......................... | 384/480 |
| 5,368,397 A * | 11/1994 | Freiwald | .................... | 384/486 |
| 5,833,372 A * | 11/1998 | Nisley | ......................... | 384/480 |
| 6,126,322 A * | 10/2000 | Otsuki et al. | ................ | 384/486 |
| 6,149,158 A * | 11/2000 | Tripathy | ..................... | 277/307 |
| 6,254,102 B1 * | 7/2001 | Vicory, Sr. | .................. | 277/390 |
| 6,485,256 B1 * | 11/2002 | Iketani | ........................ | 384/485 |

\* cited by examiner

*Primary Examiner*—Robert A. Siconolfi
(74) *Attorney, Agent, or Firm*—Thompson Coburn LLP

(57) ABSTRACT

A sealing assembly for a bearing assembly. The sealing system comprising a removable cover and a rotatable member. The bearing assembly also comprising a bearing insert and a bearing housing. The removable cover is securable to the bearing housing. The rotatable member is secured to the removable cover. The rotatable member has an opening for a rotatable shaft to pass into the bearing assembly through the rotatable member. The opening through the rotatable member is adapted to receive the rotatable shaft and to form a seal against the rotatable shaft.

25 Claims, 5 Drawing Sheets

SEALING SYSTEM FOR BEARING ASSEMBLY

BACKGROUND OF THE INVENTION

1. Field of the Invention

The present invention relates generally to the field of antifriction bearings and housings for such bearings. More particularly, the invention relates to a sealing system for a bearing assembly including features advantageous in certain applications, such as in the food and beverage industries.

2. Description of the Related Art

A wide range of applications exist for antifriction bearings, such as ball bearings, roller bearings, needle bearings and the like. In many industrial and material handling systems, such bearings perform a fundamental function of permitting rotating machine elements to turn with little resistance and thereby to effectively transmit power and motion between drive system components. Applications for such bearings include conveyors, mixers, pump drives, and the like, to mention just a few.

In general, bearings of the type commonly used in most industries include an inner race, an outer race, and a plurality of antifriction bearing elements disposed therebetween. The bearing elements are captured by the races and permit the races to rotate freely with respect to one another. The bearing assembly is typically installed in and supported by a housing. A number of housing types are known and are in common usage, including pillow block styles, two and four bolt flanged styles, take-up frame styles, and so forth. In addition to supporting the bearing inserts, such housings include features that permit them to be easily attached to machine frames and other support structures at the application. Depending upon the housing style, these features typically include support feet or flanges traversed by apertures for receiving fasteners. Once mounted on the machine frame, a base surface of the bearing housing generally abuts the machine frame and forms a solid foundation for both the bearing insert and for the machine elements held in rotation by the bearing insert.

Housings of the type described above are commonly made of a variety of materials depending upon the particular application, the loads to which the bearing insert will be subjected and the environmental conditions of the application. For example, in most bearing styles, metal housings provide sufficient mechanical support and resistance to loads. However, such metal housings are not well-suited to certain applications. Specifically, in certain industries health or environmental constraints may make the use of metal bearing housings difficult or impossible. In the food and beverage industries, conditions tend to promote the growth of fungi, molds, bacteria and other microorganisms. Health requirements often necessitate frequent washing of processing and material handling equipment including bearings and their housings. Under such conditions, the bearings within conventional bearing housings may tend to corrode or otherwise degrade in ways that would contaminate the working conditions of the machinery and/or the product processed by the machinery. Similarly, in chemical processing industries and certain marine applications the presence of corrosive substances may significantly reduce the life of conventional metal bearing housings.

There is a need, therefore, for an improved bearing assembly which can be used in applications where environmental or health conditions require superior resistance to the proliferation of microorganisms. More particularly, there is a need for a bearing assembly that will prevent contaminants, such as microorganisms, from proliferating on or within a bearing assembly.

SUMMARY OF THE INVENTION

The invention provides an innovative bearing assembly and sealing system for the bearing assembly and a method for assembly the bearing assembly. According to one aspect of the present technique, a sealing assembly for forming a seal between a bearing housing and a rotatable shaft is featured. The removable cover is securable to the bearing housing. The rotatable member is securable to the cover and adapted to receive the rotatable shaft through the rotatable member. The rotatable member is configured to form a seal against the rotatable shaft and to rotate with the shaft to maintain the seal.

According to another aspect of the present technique, a bearing assembly having a sealing system utilizing a removable cover and rotatable member is featured. The bearing assembly comprises a bearing insert and a bearing housing adapted to house the bearing insert. The removable cover is securable to the bearing housing and the rotatable member is securable to the protective cover. The rotatable member has an opening. The opening is adapted to receive the rotatable shaft and to enable the rotatable member to form a compression seal against the rotatable shaft.

According to another aspect of the present technique, a method of assembling a bearing assembly for supporting a rotatable shaft is featured. The method comprises engaging a rotatable shaft with a sealing member. The sealing member may be placed over the shaft or the shaft may be inserted through the sealing member. The rotatable member is operable to rotate with the rotatable shaft and to form a compression seal against the rotatable shaft. The method also comprises positioning the rotatable shaft through a bearing insert. The method also comprises rotatably securing the sealing member to a removable cover and securing the cover to a bearing housing.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
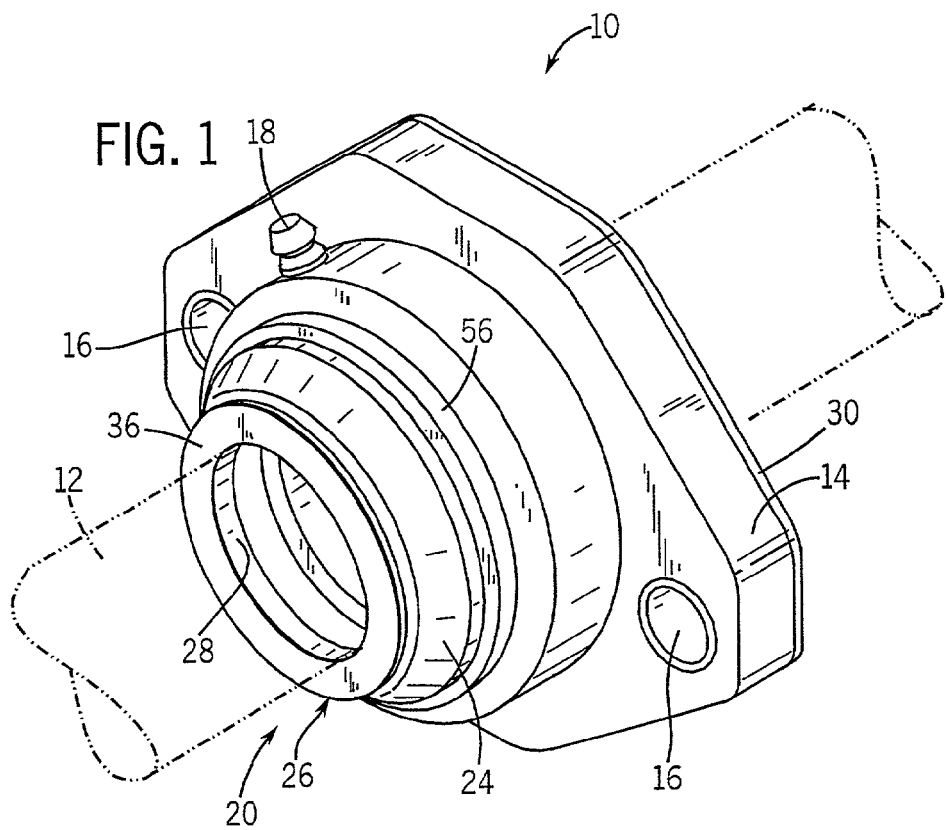
FIG. 1 is a first perspective view of a two-bolt flange bearing assembly, according to an exemplary embodiment of the present invention.
Figure 2:
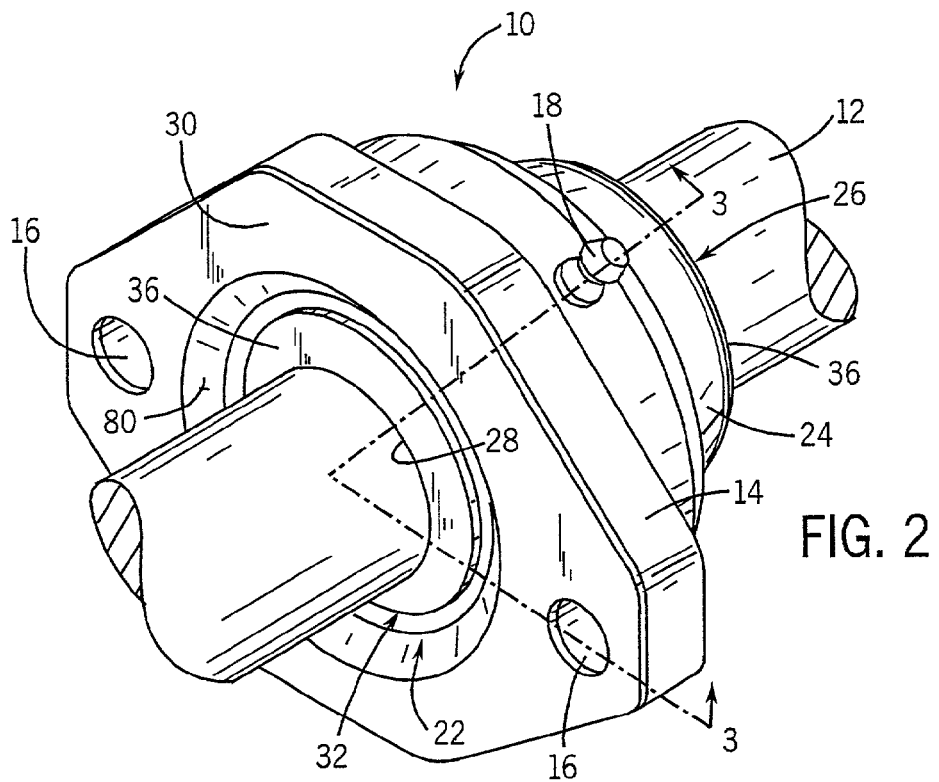
FIG. 2 is a second perspective view of the two-bolt flange bearing assembly of FIG. 1.

Turning now to the drawings and referring first to FIGS. 1 and 2, a bearing assembly, designated generally by reference numeral 10, is illustrated. FIGS. 1 and 2 illustrate different perspective views of the bearing assembly 10. The bearing assembly 10 is configured to support a rotatable shaft 12 (shown in dashed lines). In the embodiment illustrated in FIGS. 1 and 2, the bearing assembly 10 houses a bearing insert within a bearing housing 14. It should be noted that the particular embodiment illustrated in FIG. 1 as well as alternative embodiments discussed below may be configured for supporting various types of bearing inserts of known configuration. In particular, bearing assembly 10 may be configured for supporting straight roller bearings, tapered roller bearings, ball bearings, needle bearings, sleeve bearings and so forth.

In the illustrated embodiment, the bearing assembly 10 is configured as a two-bolt flange style bearing assembly. The bearing housing 14 has two holes 16 therethrough for securing the bearing assembly 10 flush against a surface with two fasteners, typically threaded bolts. Additionally, bearing housing 14 may be configured in various styles, such as a four-bolt flange, a two-stud flange, a two-bolt pillow block, a four-bolt pillow block, etc. Additionally, the bearing housing 14 has a grease fitting 18 for injecting grease into the housing 14 to lubricate the bearing inserts.

In the illustrated embodiment, the rotatable shaft 12 extends completely through the bearing assembly 10. However, the bearing assembly 10 also may be configured to support the end of the rotatable shaft 12. The bearing assembly 10 has a first sealing assembly 20 and a second sealing assembly 22 that are configured to form a seal between the shaft 12 and the bearing assembly 10 to prevent contaminants from entering the bearing assembly 10 around the shaft 12. The first sealing assembly 20 includes a removable cover 24 and a sealing member, or flinger, 26 rotatably secured to the cover 24. The rotatable flinger 26 has an opening 28 that is configured to receive the rotatable shaft 12 and form a seal around the shaft 12. The flinger 26 rotates with the shaft 12 and uses centrifugal force to throw clear of the cover 24 and shaft 12 any liquids or particulates that come into contact with the flinger 26. The second sealing assembly 22 has a flat plate 30 and a second rotatable flinger 32. In the exemplary embodiment illustrated, the flat plate 30 is comprised of a metal, such as steel. The use of a flat plate 30 permits bearing housing 14 to be mounted on a planar surface with no entrapped voids or volumes therebetween, reducing the potential for collecting moisture, debris and other substances beneath bearing housing 14.

In the illustrated embodiment, the diameter of the opening 28 is established such that a compression seal is formed between the rotatable shaft 12 and the flinger 16. The friction between the rotatable shaft 12 and the flinger 26 induces the flinger 26 to rotate with the rotatable shaft 12. Fluids and particulates, such as water, cleaning chemicals, and food debris, that come into contact with the flinger 26 as it is rotating are thrown clear of the bearing assembly 10. The flinger 26, thereby, helps to prevent contaminants from adhering to the outer surfaces of the bearing assembly 10 or seeping into the bearing assembly 10 and damaging the bearings.

Figures 3, 3A:
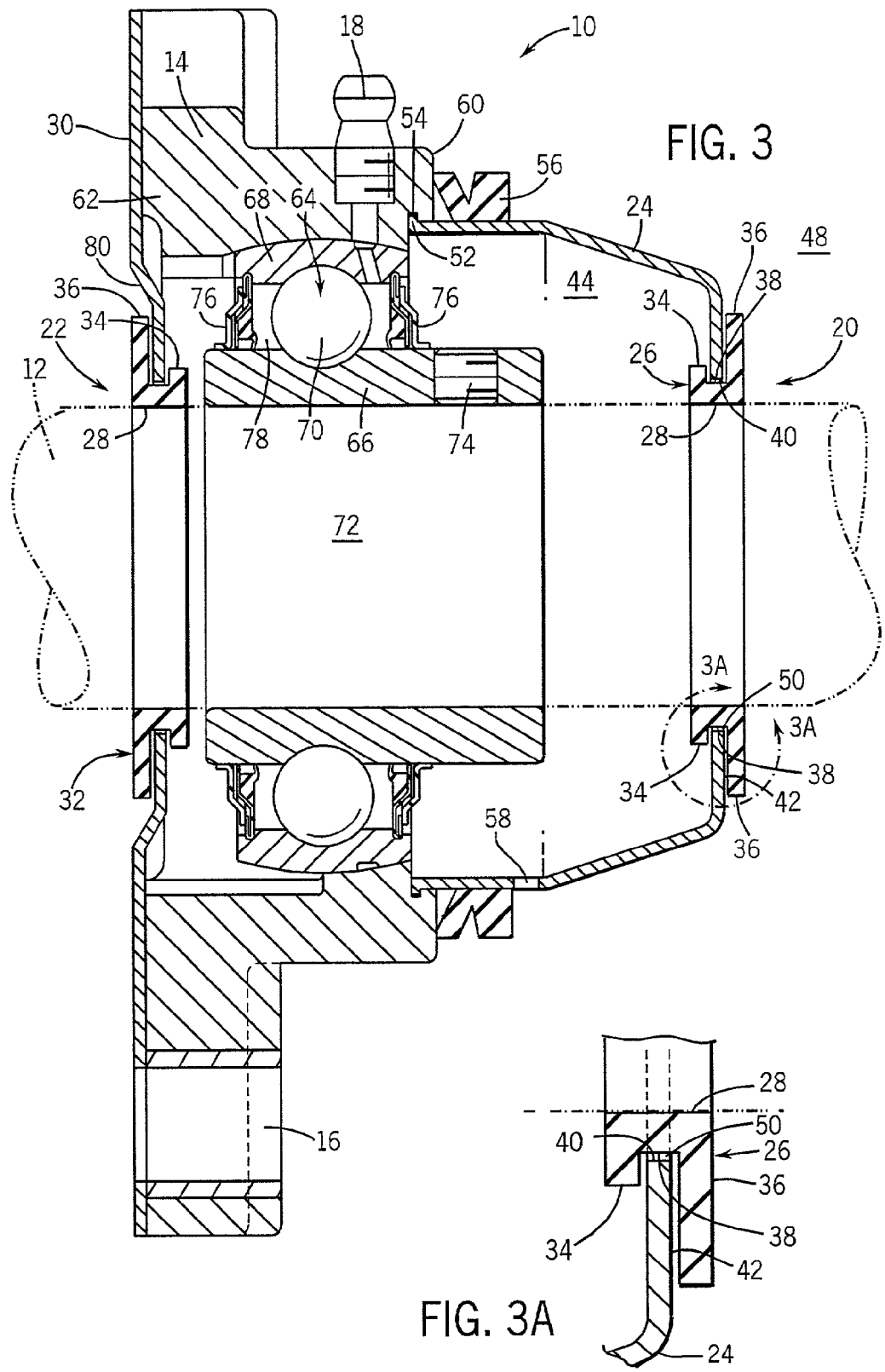
FIG. 3 is a cross-sectional view of the bearing assembly of FIGS. 1 and 2, taken generally along line 3-3 of FIG. 2.
FIG. 3A is a detailed view of a portion of FIG. 3, taken generally along line 3A-3A of FIG. 3.

Referring generally to FIGS. 3 and 3A, each flinger 26 has an inner flange 34, an outer flange 36, and a sealing portion 38 intermediate the inner and outer flanges. The outer flange 36 is larger in diameter than the inner flange 34. In the exemplary embodiment, the cover 24 and flinger 26 are comprised of a flexible polymeric material. To secure the flinger 26 to the protective cover 24, the flinger 26 is elastically deformed so that the inner flange 34 may be inserted through an opening 40 in the cover 24. The smaller diameter of the inner flange 34 enables the flinger 26 to be inserted through the opening 40 more easily. As will be appreciated by one skilled in the art, and as illustrated in FIG. 3, the insertion of flinger 26 through the opening 40 of the cover 24 defines a single-stage rotating seal between the flinger 26 and the cover 24. As the diameter of the outer flange 36 increases, the amount of liquids or solids that the flinger 36 can fling also increases. In the illustrated embodiment, the diameter of the outer flange 36 is approximately that of the cover 24 adjacent to the flinger 26. Additionally, the opening 40 is slightly larger in diameter than the outer diameter of the sealing portion 38 of the flinger 26 so that the surface 42 of the cover 24 surrounding the opening 40 allows the flinger 26 to rotate freely.

Figure 4:
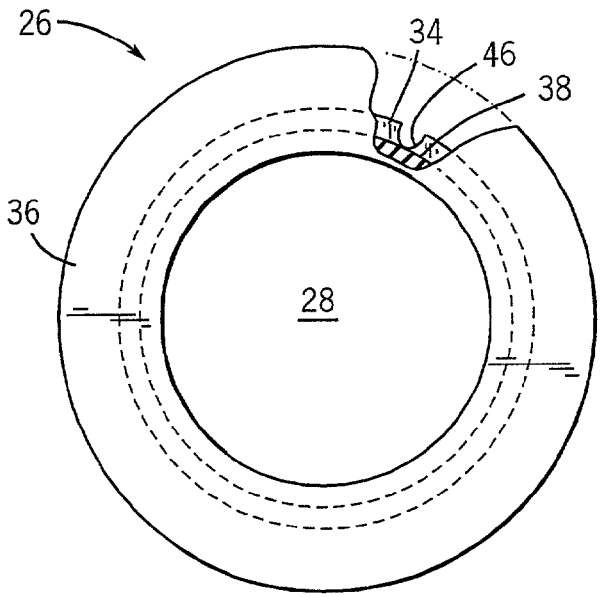
FIG. 4 is a front elevational view of a flinger, according to an exemplary embodiment of the present invention.

The interior 44 of the bearing assembly is filled with grease. The grease lubricates the bearings and is used to form a seal between the flingers and the cover 24 and plate 30. As best illustrated in FIG. 4, each flinger 26 has a grease relief 46 to enable excess grease to relieve to the exterior 48 of the bearing assembly 10. Without the grease relief 46, the pressure of the grease acting on the inner flange 34 could force the flinger 26 against the cover 24, inhibiting rotation of the flinger 26. In the illustrated embodiment, the grease relief 46 is a notch in the inner flange 34 that allows the grease to flow to the exterior 48 through the gap 50 between the sealing portion 38 of the flinger and the surface 42 of the cover 24. The grease occupying the gap 50 between the sealing portion 38 of the flinger and the surface 42 of the cover 24 forms a seal between the protective cover 24 and the flinger 26 to prevent contaminants from entering the interior 44 between the cover 24 and the flinger 26.

In the illustrated embodiment, the cover 24 is snapped into place on the bearing housing 14. The cover 24 has a flange 52 that is configured to fit within a groove 54 in the bearing housing 14 to secure the cover 24 to the housing 14. The flange 52 and groove 54 configuration also forms a seal between the cover 24 and the bearing housing 14. In the illustrated embodiment, a V-ring seal 56 also is used in forming a seal between the cover 24 and housing 14 to help prevent contaminants from entering the interior 44 of the bearing assembly 10 between the flange 52 and the groove 54. In the illustrated embodiment, protective cover 24 has a leak hole 58 to enable any moisture that gets into the interior 44 of the bearing assembly 10 to leak out.

The bearing housing 14 may be comprised of a variety of different materials. In the preferred embodiment illustrated, housing 14 is formed of a polymeric material, such as polybutyleneterephthalate (PBT) in combination with a reinforcing glass fiber. The polymeric material of which housing 14 is formed preferably constitutes a structural foam material formed by endothermic chemical nucleating and foaming agents added to the polymeric material prior to injection molding. In addition to fiber reinforcing components and a foaming agent, in the presently preferred embodiment, housing 14 includes an antimicrobial agent additive for inhibiting the growth and proliferation of bacteria, fungi, microorganisms and the like. As used herein, the terms "microorganisms" and "antimicrobial agent" are intended to refer generally to all such plant and microbial forms. As will be appreciated by those skilled in the art, such antimicrobial agents may be added to the polymeric material prior to injection molding and remain effective following the molding process.

In the illustrated embodiment, housing 14 has a front side 60 and a rear side 62, front side 60 being configured to facilitate insertion of a bearing insert into housing 14. In the illustrated embodiment, the bearing insert is a ball bearing insert 64. The structure of the bearing housing 14 permits the ball bearing insert 64 to be positioned and locked into bearing housing 14. The ball bearing insert 64 comprises a rotatable inner race 66 supported within a fixed outer race 68 by a plurality of ball bearings 70. The ball bearings 70 enable the inner race 66 to rotate freely within the bearing assembly 10. The rotatable shaft 12 is inserted through the interior 72 of the inner race and secured to the inner race by a set screw 74 threaded through the inner race 66 and into contact with the shaft 12. Each side of the ball bearing insert 64 has an internal flinger 76. The internal flinger 76 forms a seal around the inner race 66 to prevent any contaminants from entering the interior 78 of the ball bearing insert 64 and damaging the ball bearings 70. Additionally, the internal flingers rotate with the inner race 66 to throw grease and other contaminants from the region of the shaft 12 proximate to the internal flinger 76.

In the illustrated embodiment, the second flinger 32 is identical to the first flinger 26. The flat plate 30 is shaped to form a recess 80 so that the second flinger 32 does not extend beyond the back plane of the flat plate 30. This enables the bearing assembly 10 to be mounted flush against a flat surface without impeding the rotation of the second flinger 32.

Figure 5:
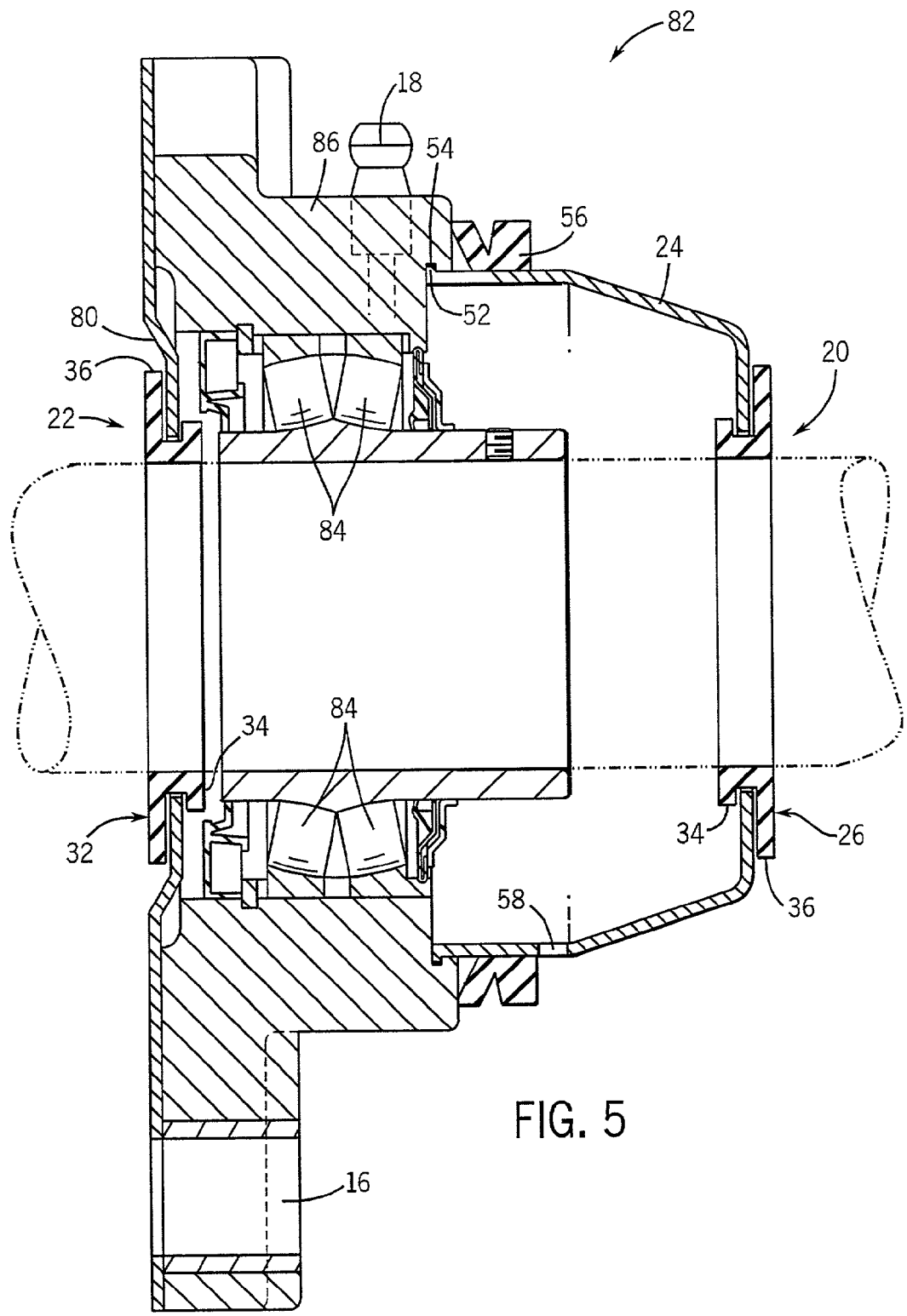
FIG. 5 is a cross-sectional view of a bearing assembly, according to an alternative embodiment of the present invention.

As discussed above, alternative embodiments discussed below may be configured for supporting various types of bearing inserts of known configuration. Referring generally to FIG. 5, an alternative embodiment of a bearing assembly having a protective cover 24 and flinger 26 is illustrated. In the illustrated embodiment, the alternative bearing assembly 82 is configured to support roller bearings 84, rather than ball bearings 70.

Figure 6:
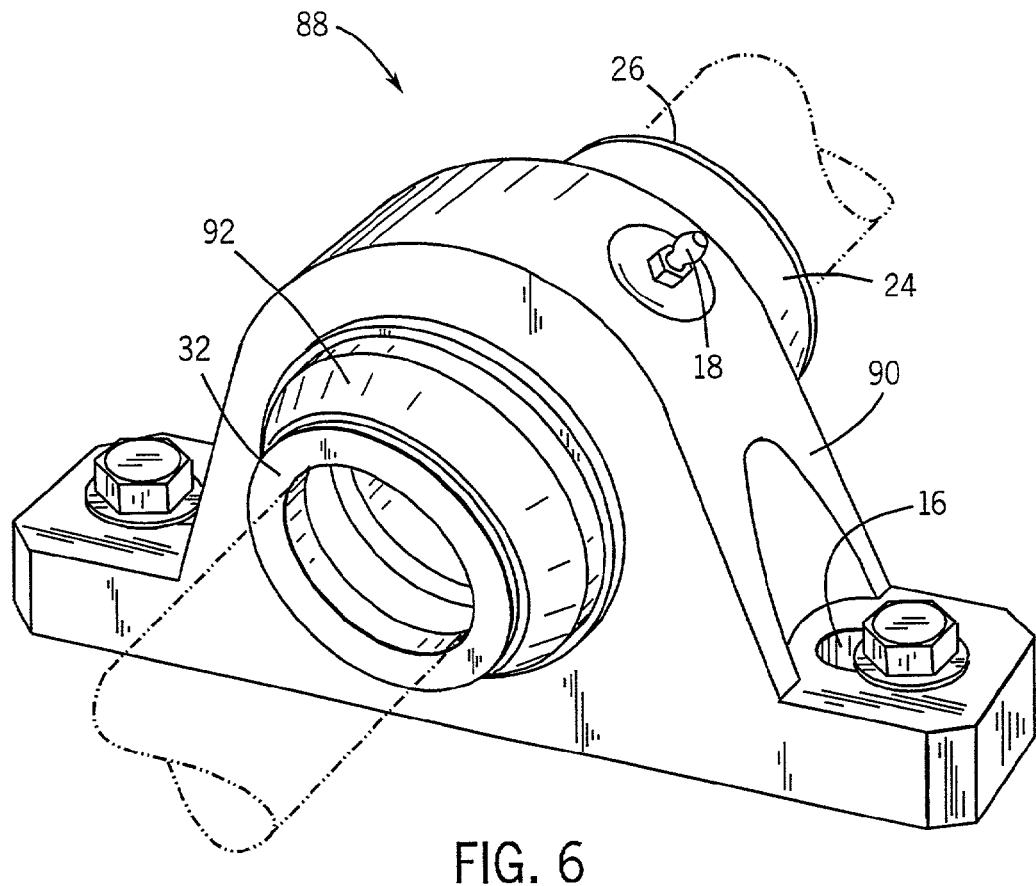
FIG. 6 is a perspective view of a bearing assembly, according to an alternative embodiment of the present invention.

Also, as discussed above, the bearing assembly 10 may be configured in a variety of styles. Referring generally to FIG. 6, an alternative embodiment of a bearing assembly having a protective cover and flinger 26 is illustrated. In the illustrated embodiment, the alternative bearing assembly 88 is configured with a two-bolt pillow block bearing housing 90. Additionally, the pillow-block housing uses a second protective cover 92, rather than a flat plate, to secure the second flinger 32 to the bearing housing 90. In this embodiment, the second protective cover 92 is identical to the first protective cover 24. However, both the second protective cover 92 and the second flinger 32 could be configured differently than the first protective cover 24 and the first flinger 26.

Figure 7:
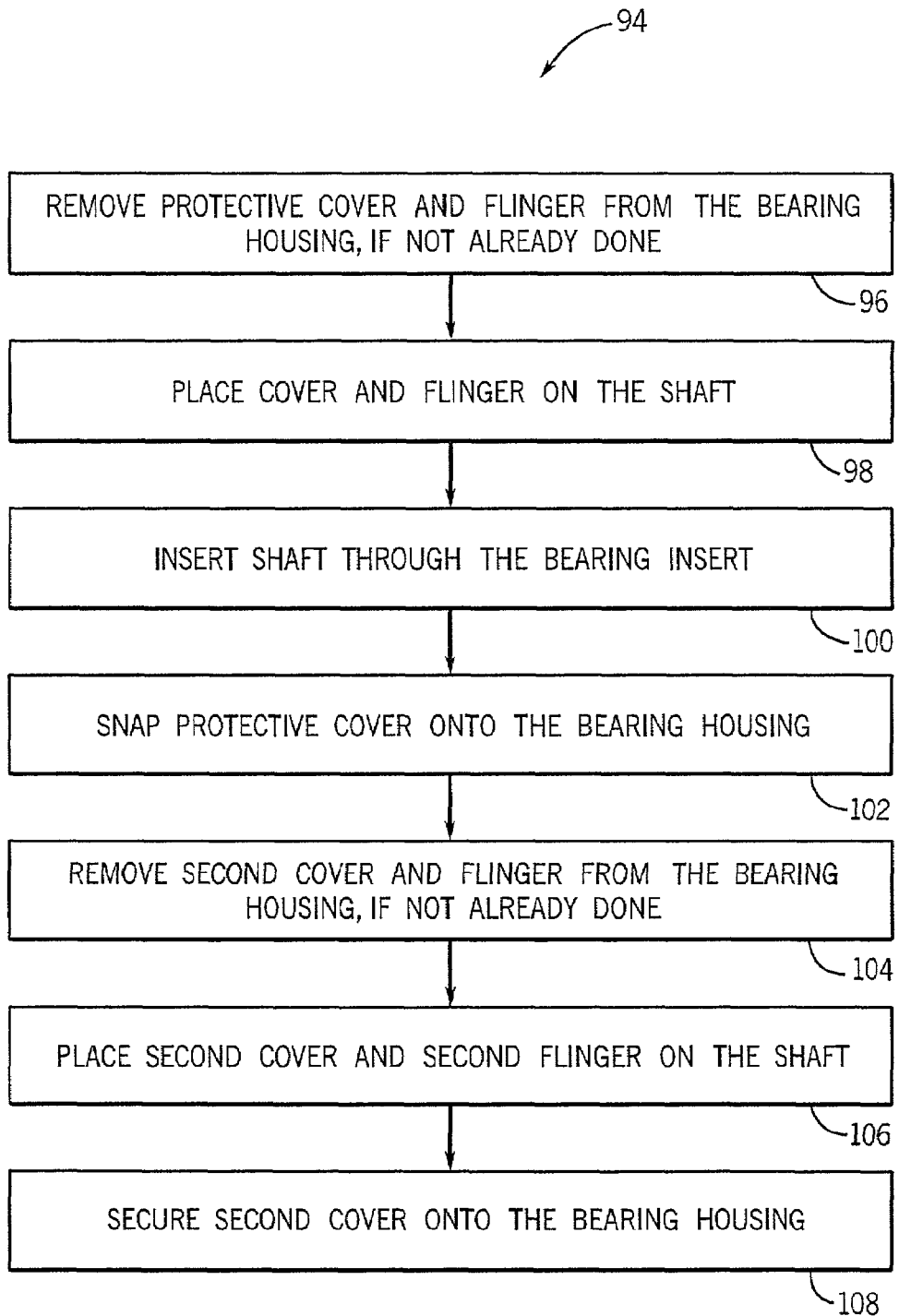
FIG. 7 is a block diagram of a process for supporting a rotatable shaft using a bearing assembly having a protective cover and a rotatable flinger.

Referring generally to FIG. 7, a block diagram of the exemplary steps in the process of supporting a rotatable shaft using a bearing assembly having a protective cover and a rotatable flinger is illustrated. As part of the process, designated generally by reference numeral 94 in FIG. 7, the protective cover and flinger are removed from the bearing housing, if not already done so, as represented by block 96. The protective cover and flinger are then placed over the shaft or, alternatively, the shaft is inserted through the protective cover and flinger, as represented by block 98. The shaft is then inserted through the bearing housing and bearing insert, as represented by block 100. The protective cover is then secured to the bearing housing, such as by snapping the cover into place on the housing, as represented by block 102.

If the rotatable shaft is to extend through the bearing assembly, rather than terminate at the bearing assembly, a second cover and a second flinger may be used to seal the shaft to the bearing assembly. Just as with the first cover and flinger, the second cover and second flinger are removed from the bearing housing, if not already done so, as represented by block 104. The protective cover and flinger are then placed over the shaft or, alternatively, the shaft is inserted through the protective cover and flinger, as represented by block 106. The protective cover is then secured to the bearing housing, such as by snapping the cover into place on the housing or by securing the cover to the housing with a threaded fastener, as represented by block 108.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A bearing assembly, comprising:
   a bearing insert;
   a bearing housing adapted to house the bearing insert;
   a cover removably securable to the bearing housing, wherein the cover extends outwardly beyond an outermost edge of the bearing housing; and
   a rotatable flinger secured to the cover outwardly beyond the outermost edge of the bearing housing and configured to form a single-stage rotating seal, the rotatable flinger comprising:
      a first opening therethrough, the first opening being adapted to receive a rotatable shaft and to enable the rotatable flinger to form a compression seal against the rotatable shaft; and
      an outer flange disposed external to the cover to fling material that comes into contact with the outer flange away from the bearing assembly.

2. The bearing assembly as recited in claim 1, wherein the rotatable flinger has an inner flange, the inner and outer flanges having a greater diameter than a second opening through the cover, the inner and outer flanges cooperating with a portion of the cover surrounding the second opening to secure the rotatable flinger to the cover.

3. The bearing assembly as recited in claim 2, wherein the inner flange is smaller in diameter than the outer flange.

4. The bearing assembly as recited in claim 2, further comprising a grease relief to enable grease within the bearing assembly to pass to a location exterior of the bearing assembly.

5. The bearing assembly as recited in claim 4, wherein the grease relief comprises a notch in the inner flange.

6. The bearing assembly as recited in claim 1, wherein the bearing insert comprises a plurality of ball bearings.

7. The bearing assembly as recited in claim 1, wherein the bearing insert comprises a plurality of roller bearings.

8. The bearing assembly as recited in claim 1, wherein the cover comprises a peripheral flange and the bearing housing comprises an annular groove, wherein the cover is secured to the bearing housing by elastically deforming the cover to position the peripheral flange within the annular groove.

9. The bearing assembly as recited in claim 8, further comprising an external sealing member positionable adjacent the bearing housing and the cover to form a seal between the bearing housing and the cover.

10. The bearing assembly as recited in claim 1, wherein the shaft extends through the bearing assembly, the bearing assembly further comprising a second cover and a second rotatable flinger secured to the second cover to form a seal between the bearing assembly and the shaft, the second cover and second rotatable flinger being disposed opposite the first cover and the first rotatable flinger on the bearing housing.

11. The bearing assembly as recited in claim 1, wherein the cover is adapted to form an interior volume when secured to the bearing housing.

12. A sealing assembly for forming a seal between a bearing assembly and a rotatable shaft, comprising:
   a cover removably securable to a bearing housing, wherein the cover is configured to be disposed on the exterior of the bearing housing and to extend outwardly beyond an outermost edge of the bearing housing; and
   a rotatable member securable to the cover outwardly beyond the outermost edge of the bearing housing and adapted to receive the rotatable shaft therethrough, the rotatable member being configured to form a single-stage rotating seal and to form a seal against the rotatable shaft and to rotate therewith to fling liquids or solids that come into contact with the rotatable member away from the cover.

13. The sealing assembly as recited in claim 12, wherein the sealing assembly is adapted to form the single-stage rotating seal between the rotatable member and the cover.

14. The sealing assembly as recited in claim 13, wherein the rotatable member comprises an inner flange and an outer flange, the inner and outer flanges being disposed on opposite sides of the cover to secure the rotatable member to the cover.

15. The sealing assembly as recited in claim 14, wherein the inner and outer flanges are circular, the outer flange being larger in diameter than the inner flange.

16. The sealing assembly as recited in claim 14, further comprising grease, wherein the grease forms a seal between the rotatable member and the cover.

17. The sealing assembly as recited in claim 16, further comprising a grease relief in the inner flange.

18. The sealing assembly as recited in claim 12, wherein the cover comprises a peripheral flange configured for insertion within an annular groove of a bearing housing to secure the cover to the bearing housing.

19. The sealing assembly as recited in claim 18, wherein the cover comprises an elastically deformable material.

20. The sealing assembly as recited in claim 12, wherein the cover comprises a rigid plate.

21. A method of assembling a bearing assembly for supporting a rotatable shaft, comprising the acts of:
   engaging a rotatable shaft with a flinger operable to rotate with the rotatable shaft and form a compression seal therewith;
   positioning the rotatable shaft through a portion of a bearing insert;
   rotatably securing the flinger to a removable cover by disposing the cover between an inner flanged portion of the flinger and an outer flanged portion of the flinger; and
   securing the cover to a bearing housing by disposing a flanged portion of the cover into a grooved portion of the bearing housing.

22. The method as recited in claim 21, wherein rotatably securing the sealing member to the removable cover is performed prior to engaging the rotatable shaft with the flinger.

23. The method as recited in claim 21, wherein engaging comprises sliding the flinger over the rotatable shaft.

24. The method as recited in claim 21, wherein the securing the removable cover to a bearing housing is performed by snapping the removable cover onto the bearing housing to force the flanged portion of the cover into the grooved portion of the bearing housing.

25. The method as recited in claim 21, further comprising the act of securing the bearing insert to the bearing housing.

* * * * *